Sept. 3, 1929.    M. J. PAYNE    1,726,762
TIRE VALVE
Filed May 17, 1921
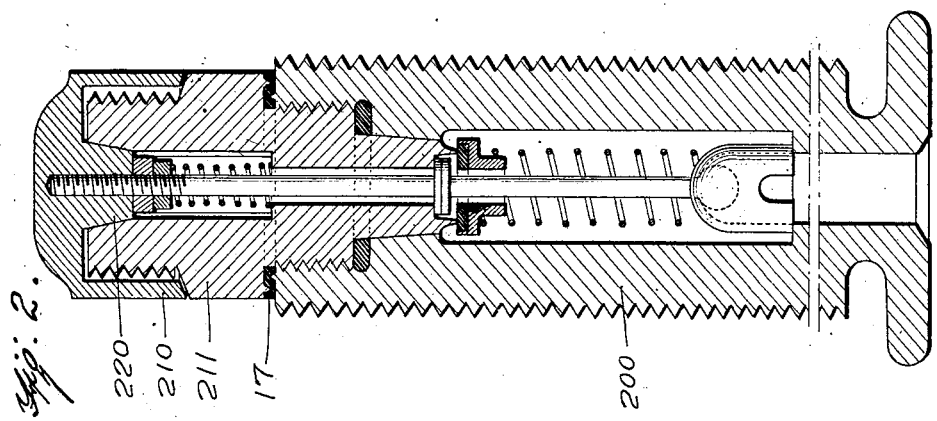
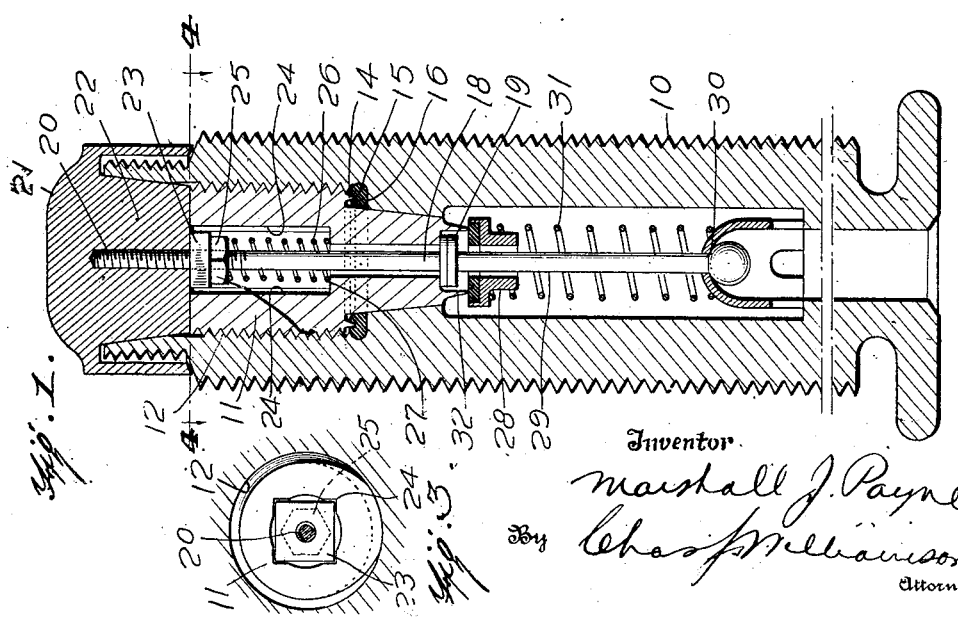
Inventor
Marshall J. Payne
By Chas. J. Williamson
Attorney Patented Sept. 3, 1929.

1,726,762

UNITED STATES PATENT OFFICE.

MARSHALL J. PAYNE, OF STAUNTON, VIRGINIA, ASSIGNOR TO THE PAYNE VALVE CORPORATION, OF STAUNTON, VIRGINIA, A CORPORATION.

TIRE VALVE.

Application filed May 17, 1921. Serial No. 470,261.

My invention has to do with valves for pneumatic tires with the object in view of preventing air leakage through those passages and joints that are inevitable in the structure and thus increasing the efficacy of such valves. Another object is to diminish cost of construction. My invention consists in the construction described by or embraced within the language or scope of the appended claim.

In the drawings:

Fig. 1 is a longitudinal section of a valve embodying my invention;

Fig. 2 is a similar view illustrating another embodiment;

Fig. 3 is a cross section on the line 4—4 of Fig. 1.

The type of valve in which I prefer to embody my invention is one in which the valve head is positively held to its seat after the tire has been inflated and thus does not depend upon the air pressure within the tire to maintain the valve head upon its seat. However, my invention in regard to certain features of construction is applicable to valves of the type which has no positive means to hold the valve to its seat. I illustrate my invention embodied in valves of both types, Fig. 1 showing the first mentioned type and Fig. 2 the second mentioned type.

Describing first in detail what appears in Fig. 1, there is employed the usual tire stem, 10, into the outer end of which is placed a removable tubular body, 11, that has external thread, 12, for a portion of its length for engaging internal thread at the outer end of the tire stem, 10. The inner end portion, of the tubular body, 11, tapers inwardly to engage a correspondingly tapered internal surface on the stem, 10, in order to form a tight joint therewith and preferably where the taper portion adjoins the threaded portion, 12, there is an annular rib or ridge, 14, that is embedded in a gasket, 15, that rests upon an internal shoulder, 16, provided in the tire stem, this arrangement adding a further safeguard against air leakage.

Extending loosely through the tubular body, 11, is a rod or stem, 18, which at midlength has a valve head, 19, adapted to seat against the inner end of the taper portion, of the body, 11, said valve head, 19, being preferably made integral with the stem, 18, to eliminate any joint between them which would exist should the two parts be made separate. The outer end of the stem, 18, is externally threaded for engagement by internal thread, 20, of a cap, 21, which by rotation in a clockwise direction acts to impart outward longitudinal movement to the stem, 18, and thereby effect the positive seating of the valve head, 19, and by opposite rotation is disengaged from the stem to allow the attachment to the outer end of the tire stem, 10, of the customary flexible tubing that takes air under pressure from a suitable source to inflate the tire. The internal thread, 20, on the cap, 21, is cut within a tapering boss or projection, 22, on the interior of the cap, 21, which seats against a correspondingly tapered interior surface at the outer end of the tire stem, 10. Also upon the threaded outer end of the stem, 18, is screwed a nut, 23, whose corners or other external projections thereon engage longitudinally extending grooves, 24, at the sides of the bore through the body, 11, so as to prevent turning of the stem, 18, when the cap, 21, is revolved and thus result in longitudinal movement being imparted to the stem, 18, when the cap, 21, is revolved. Alongside the nut, 23, is a lock nut, 25, that prevents turning of the stem, 18. When the cap, 21, is rotated counter clock-wise to separate it from the stem, 18, tendency to rotate the stem will jam the nut, 25, against the inner side of the nut, 23. The lock-nut, 25, also forms the bearing for the outer end of the coil spring, 26, whose inner end bears against a shoulder, 27, within the bore of the body, 11, and which spring serves by its outward expansion yieldingly to move the valve, 19, to its seat. It will be understood that the threaded outer end portion of the stem, 18, is of a diameter that permits the two nuts, 23 and 25, being screwed upon the stem from its outer end and thus no obstacle exists to making the valve head, 19, integral with the stem, 18, and assemblage of them is effected by introducing the stem, 18, without the nuts upon it into the tubular body, 11, from the inner end of the latter.

Besides the valve, 19, and its seat at the inner end of the tubular body, 11, I provide as an additional safeguard against leakage through the body, 11, a second valve and seat, such second valve being a tubular member or thimble, 28, through which an extension, 29, of the valve stem, 18, passes and between the valve, 28, and a bearing, 30, at the inner end of such stem extension, 29, is a coil spring, 31, that acts expansively upon the valve, 28, yieldingly to press it against its seat, 32, on the inner end of the tubular body, 11, which seat may, as shown, be an annular rib surrounding the valve head, 19. Inasmuch as the valve member, 28, has no positive connection with the valve stem, 18, it will be seen that the seating of neither valve, 19, and 28 interfere in any way with the complete seating of the other, but each is free to be set against its seat with all the force available for the purpose. It will be seen that the valve, 28, is forced to its seat by the conjoint action of both springs 26 and 31, the force of the spring, 26, being exerted through the bearing, 30, against the spring, 31, and the power of the latter being increased by the valve seating action of the cap.

In the form of my invention illustrated in Fig. 2, the tubular body, 111, screwed into the outer end of the tire stem, 110, does not have a tapered inner end and corresponding to the tapered portion, of Fig. 1, nor is any positive means such as the cap, 21, provided to seat a valve head but spring action and the pressure of air within the tire is depended upon for valve seating. In the construction shown in Fig. 2, a valve, 190, corresponding in position to the valve, 19, of Fig. 1, is loose on a stem, 180, and seats upon one side against a seat, 33, at the inner end of the tubular body, 111, and upon its opposite or inner side against the adjacent face of a valve, 280, loose on the stem, 180. A coil spring, 260, is interposed between a shoulder in the bore of the tubular body, 111, beyond the outer side of the valve, 190, and its shoulder, 34, at the outer end of the stem, 180, and a coil spring, 310, is interposed between a shoulder, 300, at the inner end of the stem, 180, and the valve, 280, yieldingly to force the outer side of the valve, 280, against an annular seat, 320, at the inner end of a tubular body, 111. It will be seen that as in case of construction shown in Fig. 1, the force of the spring, 260, is transmitted through the stem, 180, to the spring, 310, to the valve, 280, to seat the latter.

In the form of my invention shown in Fig. 1, the tubular body, 11, is contained wholly within the tire stem, this being a desirable arrangement for compactness' sake, but, as shown in Fig. 2, if desired the tubular body, 211, may extend beyond the top of the tube stem, 200, and in this case the valve seating cap, 210, has its tapering internal projection, 220, engaging a corresponding bearing formed in the outer end of the tubular body, 211, instead of engaging such a bearing at the outer end of the tire stem, 10, as shown in Fig. 1. In all other respects the structure shown in Fig. 2 is similar to that shown in Fig. 1.

From the various embodiments of my invention illustrated in the drawing, it will be seen that my invention may be put into practice in diverse forms, and other variations from the structure than I have indicated by my illustration may be made. Hence the scope of my protection is not to be measured by the particular constructions and the construction of parts thereof shown and described, but by the scope of the following claim.

An important feature of my invention is the action of the two springs on one valve head and on opposite sides of the latter, one pulling and the other pushing it to its seat, for thereby likelihood of wobbling or tipping of the valve head is removed and it seats squarely and tight upon its seat.

What I claim is:

A valve mechanism comprising a tubular body having a valve seat, a stem situated within such body and longitudinally movable therein, a rotary device having a threaded connection with said stem, two nuts on a threaded portion of the stem one of which is a lock nut, and means engaging the other nut to prevent rotation thereof.

In testimony whereof I hereunto affix my signature.

MARSHALL J. PAYNE.